United States Patent [19]

Holmes et al.

[11] 4,165,503
[45] Aug. 21, 1979

[54] HYDROSTATIC SEISMIC SENSOR

[75] Inventors: Allen B. Holmes, Rockville; Stacy E. Gehman, Takoma Park, both of Md.

[73] Assignee: The United States of America as represented by the Secretary of the Army, Washington, D.C.

[21] Appl. No.: 858,983

[22] Filed: Dec. 9, 1977

[51] Int. Cl.² ............................................. G01V 1/16
[52] U.S. Cl. ............................... 340/17 R; 73/516 R
[58] Field of Search ............ 340/17 R; 73/515, 516 R, 73/502, 382

[56] References Cited

U.S. PATENT DOCUMENTS

| 2,776,829 | 1/1957 | Cockram | 73/515 |
| 3,221,562 | 12/1965 | Borcher et al. | 73/515 |

Primary Examiner—Theodore M. Blum
Attorney, Agent, or Firm—Nathan Edelberg; Robert P. Gibson; Saul Elbaum

[57] ABSTRACT

A hydrostatic seismic sensor including a sensing mass suspended on a deformable reservoir containing a sensing fluid and a differential pressure transducer to measure the pressure in the reservoir.

5 Claims, 1 Drawing Figure

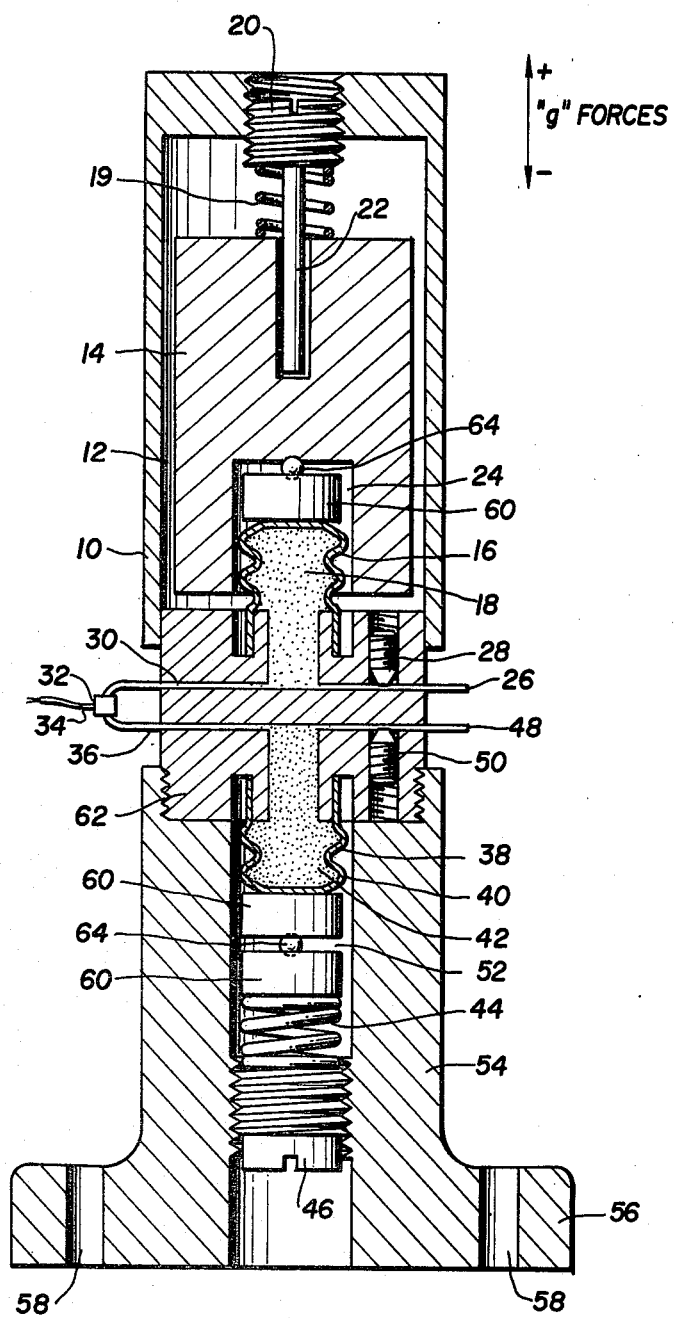

HYDROSTATIC SEISMIC SENSOR

RIGHTS OF THE GOVERNMENT

The invention described herein may be manufactured, used, and licensed by or for the United States Government for governmental purposes without the payment to me of any royalty thereon.

BACKGROUND OF THE INVENTION

This invention relates to fluid seismic sensors and more particularly to sensors for the measurement of vibration and linear acceleration. Specifically, the present invention relates to sensors wherein a sensing mass and sensing fluid acting in concert on a pressure transducer that provides an electrical output in response to the "g" loading. The sensors of the invention are applicable for a wide range of "g" measurements, and is only limited by the limitations of the gauge used.

Fluid sensors are known to measure ground motion. The sensors of the present invention differ from conventional sensors by means employed in translating the motion to the transducer. In a typical device of the present invention the hydrostatic pressures developed in the sensing masses are directly proportional to the applied "g" load and measured by a pressure transducer.

SUMMARY OF THE INVENTION

It is an object of this invention to provide sensors which are inherently insensitive to transverse loads.

Other objects of this invention are to provide sensors which are unaffectd by high acoustic noise levels, are operable in a wide temperature range, and are insensitive to impact loading during handling.

A further object is to provide a sensor capable of measuring various "g" forces using available transducers.

The present invention achieves the objects set forth by unilaterally loading or differentially loading a pressure transducer. The differential loading is used to increase the sensitivity of the transducer to low and micro "g" forces. The sensors of the present invention for differential loading include a housing having a first interior chamber and a second interior chamber, separated by conduit means leading to a pressure transducer. The first chamber includes a solid sensing mass, a fluid sensing mass in a flexible reservoir and a resilient element, and the second chamber includes a fluid in a flexible reservoir and a resilient element. The solid sensing mass is interposed between the resilient element and the flexible reservoir. The fluid may be any gas or low density liquid that is relatively insensitive to "g" forces to be measured within the range sensitivity of the transducer.

The first and second interior clambers maintain a differential pressure across the transducer at a level less than the range of the gauge employed. The sensing mass and sensing fluid of the first chamber are responsive to the "g" force whereas the sensing fluid in the second chamber is for all practical purposes insensitive to "g" forces.

In the embodiment of the present invention for unilaterally loading a pressure transducer, the sensors include a housing having only the first interior chamber described above. The reverse or back portion of the transducer in these sensors is vented to the atmosphere.

These and other objects and advantages of this invention will be apparent from the following description with reference to the accompanying drawings.

BRIEF DESCRIPTION OF THE DRAWING

The FIGURE is a cross-sectional view of a hydrostatic sensor for the measurement of "g" forces according to the present invention.

DESCRIPTION OF THE PREFERRED EMBODIMENT

Referring now to the FIGURE, a "g" sensor according to this invention is illustrated which comprises a container or housing 10 made of a rigid material having a first chamber 12 therein. A sensing mass 14 and a flexible reservoir 16 for sensing fluid 18 are accommodated in the chamber 12. The housing 10 is secured to base 62.

Sensing mass 14 is disposed between flexible reservoir 16 and resilient element 19. An adjustable means 20 is threadably received in the top of the housing 10 to alter the load on resilient element 19 and extends into a cavity 22 in sensing mass 14 to maintain alignment of resilient element 19 and sensing mass 14 within chamber 12.

Flexible reservoir 16 is interposed in a hollow portion 24 in sensing mass 14. The fluid in the reservoir is maintained by means of fill tubes 26 which are controlled by valve 28. Channel 30 connects flexible reservoir 16 to pressure transducer 32. Transducer output conductors 34 are provided to transmit the signal.

In the unilaterally loading sensor of the present invention, tube 36 of pressure transducer 32 is vented to the atmosphere.

In the differentially loading sensor of the present invention, tube 36 connects to flexible reservoir 38 in chamber 40. Flexible reservoir 38 contains sensing fluid 42 and is adjacent to resilient element 44 whose load on sensing fluid 42 is controlled by adjustable means 46.

The fluid 42 in flexible reservoir 38 is maintained by means of fill tube 48 that is controlled by valve 50.

The reservoir 38 and resilient element 44 are housed in chamber 52 in housing 54 which has an expanded portion 56 that serves as a mounting base for attaching the device to the situs for its use by means of holes 58.

Flexible reservoirs 16 and 38 and resilient element 44 each have solid portions 60 to provide a stable contact surface and to prevent damage to the reservoirs. In a preferred embodiment, a ball bearing 64 rests in a groove in solid portion 60.

Structure 62 houses fill tubes 26 and 48, valves 28 and 50, channel 30 and tube 36 and acts as a connector between housing 10 and 54 and is threadably received in the mounting base.

Valves 28 and 50 may be located in the housing as shown or exterior to the housing along the fill tubes. Any suitable means of closing fill tubes 26 and 48 may be used.

In both embodiments of the present invention, all of the chambers and chamber portions are colinear and lie along the "g" axis.

In the event that extremely high temperatures produce thermal expansion of sensing fluids 18 and 42, said expansion will be negated by resilient elements 19 and 44 respectively and therefore have no effect on the sensitivity of the device.

The sensing mass 14 is suspended on flexible reservoir 16 within chamber 12 in such a manner that it is subject to no other forces other than the "g" forces to be measured.

The operation of a sensor of the present invention is shown by the following example.

In an acceleration field, mass 14 exerts a force on reservoir 18 which is equal to $$F = ma$$

where
F = force (lbs)
m = mass (slugs)
a = gravitational constant

The pressure p developed in reservoir 18 is equal to the resulting force divided by the cross-sectional area of the reservoir as given by $$P = F/A$$

where
P = pressure (lbs/in$^2$)
A = area (in$^2$)
F = force (lbs)

In a gravitational field where g is equal to 32.2 ft/sec$^2$, the pressure in reservoir 18 is equal to the weight of the sensing mass divided by the area of reservoir 18. The pressure ($P_b$) in reservoir 38 is equal to the compressive force exerted by resilient element 44 on reservoir 38. The pressure ($P_b$) is constant and used to maintain the pressure difference ($P_a - P_b$) equal to zero in a 1g gravitational field.

The sensitivity of a sensor is a function of the weight of the sensing mass, area of the reservoir, and the full scale pressure rating of the gauge used to measure pressure. For example, if $F/A = 1000$ psi at sea level ($g = 32.2$ ft/sec$^2$) an increase of 1 g will produce a pressure equal to 2,000 psi in reservoir 18. When $P_b$ is adjusted to produce a pressure in reservoir 38 equal to 1,000 psi, the pressure difference across the gauge is 1,000 psi. This means that if the gauge has a full scale output of 5 volts at 1,000 psi, the signal output of the sensor will equal 5 volts/g.

The resolution of a given instrument is the smallest change in mechanical input (acceleration) for which a change in electrical output is discernable. Resolution is a function of gauge performance. A typical gauge can easily resolve a pressure differential equal to 1/750 of its full scale range or in this case 0.075 psi. The "g" loading required to produce this pressure (0.075 g) establishes the lower sensitivity limit on a given sensor. It should be noted that if the 1,000 psi gauge is replaced with a 1 psi gauge that the resolution then becomes equal to 0.075 g × (1 psi/1,000 psi) = 0.000075 or $7.5 \times 10^{-5}$ g.

The maximum g load that can be measured with a given device is set by the maximum pressure that can be measured within the linear range of the transducer. The maximum "g" load that can be applied before damage occurs is typically equal to about 2–2.5 times the rated output of the transducer.

The differential pressure transducers employed in the present invention are resistive strain gauges that respond to steady state and dynamics pressure loading. These gauges combine the major advantages of low cost, subminiature size, excellent linearity, repeatability and proven reliability.

The high output and low impedance inherent in these transducers make the hydrostatic sensors of the present invention suitable for use in hostile environments without the need for expensive signal conditioning equipment. Possible applications for the sensors of the invention are for the detection and monitoring of earthquakes and nuclear explosions when placed, for example, in abandoned oil wells, as sensors for oceanic wave motion studies, as motion sensors for offshore platforms, for the monitoring of troop and equipment movement, for measuring vehicle motion of re-entry vehicles or earth penetrating missiles and as level sensors. The resolution of the hydrostatic sensors of this invention are determined by the operating characteristics of the differential pressure transducers on gauges used to measure pressure. The gauges used in a typical unit can produce a reliable output equal to about 1/750 of its rated full scale output. This means that a gauge rated at twenty-five psi can resolve a pressure equal to 0.033 psi. The "g" loading required to produce this pressure establishes the lower sensitivity limit of a given device.

The upper limit on range is established by the maximum pressure that the transducer can be operated at within its linear range. The "g" load or pressure that a given device can withstand before damage occurs to the instrument is equal to approximately two to two and one-half times its rated output.

Sensitivity can be extended by biasing the pressure gauges. For example, if a twenty-five psi gauge has a load equal to twenty-five psi on it at one g, this pressure can be balanced with a pressure that is equal and applied to the opposite side of the transducer as shown in the drawing. Doing this also permits using a more sensitive transducer if higher sensitivity is needed.

Ultra-low or micro "g" measurements can be accomplished with the embodiment as illustrated in the FIGURE. In the embodiment shown, the weight of the sensing mass is used to develop a high pressure (about 1,000 psi) in the sensing chamber. Thus, for every "g" applied to the unit, the pressure will increase by 1,000 psi. However, the measurement of micro "g" forces, of the order of $3 \times 10^{-5}$ g, equivalent to 0.03 psi, requires a sensitive-gauge such as a biased gauge with a full scale range of 25 psi and the pressurizing of the reference side of the gauge with a sensing fluid.

The fluid sensing mass can be any suitable liquid such as Dow Corning 200 Fluid or mercury.

From the preceding description of the preferred embodiments, it is evident that the objects of the invention are attained and although the invention has been described and illustrated in detail, it is to be clearly understood that the same is by way of illustration and example only and is not to be taken by way of limitation. The spirit and scope of this invention is to be limited only by the terms of the appended claims.

We wish it to be understood that we do not desire to be limited to the exact details of construction shown and described, for obvious modifications can be made by a person skilled in the art.

I claim:
1. A hydrostatic seismic accelerometer comprising:
   a housing including a first interior chamber;
   a sensing mass in said first chamber, said sensing mass having first and second coaxial cavities;
   an alignment pin attached to said housing and extending into said first cavity for maintaining the alignment of said sensing mass;
   a first flexible closed reservoir, containing a sensing fluid, extending into said first chamber and into said second cavity to support said sensing mass;

a first spring encircling said alignment pin and biasing said sensing mass against said first reservoir;

a mounting base connected to said housing, said base having a second interior chamber;

a second flexible closed reservoir, containing a sensing fluid, extending into said second chamber;

a second spring biased against said second reservoir;

a differential pressure transducer having one side connected to said first reservoir and the other side connected to said second reservoir; and valve means for venting said second reservoir to the atmosphere.

2. The accelerometer of claim 1 further including a first adjustable means to alter the load on said first spring and a second adjustable means to alter the load on said second spring whereby the pressure in one reservoir can be balanced against the pressure in the other reservoir.

3. The accelerometer of claim 2 wherein said first reservoir comprises a first solid portion for engaging said sensing mass and said second reservoir comprises a second solid portion for engaging said second spring.

4. The accelerometer of claim 3 further including a valve means for filling or changing said sensing fluid in said first reservoir.

5. The accelerometer of claim 4 further including a groove in said first solid portion and a ball bearing resting in said groove and engaging said sensing mass to provide a stable contact surface between said first reservoir and said sensing mass.

* * * * *